US006878319B2

(12) United States Patent
Browne et al.

(10) Patent No.: US 6,878,319 B2
(45) Date of Patent: Apr. 12, 2005

(54) PROCESS FOR THE PRODUCTION OF A DETERGENT BAR

(75) Inventors: Michael Andrew Browne, Bebington (GB); Paul Lloyd, Bebington (GB); Sudhir Mani, Bebington (GB); Christine Ann Overton, Bebington (GB); Frederick Edmund Stocker, Bebington (GB)

(73) Assignee: Unilever Home & Personal Care USA, a division of Conopco, Inc., Greenwich, CT (US)

( * ) Notice: Subject to any disclaimer, the term of this patent is extended or adjusted under 35 U.S.C. 154(b) by 275 days.

(21) Appl. No.: 09/827,885

(22) Filed: Apr. 6, 2001

(65) Prior Publication Data

US 2001/0039254 A1 Nov. 8, 2001

(30) Foreign Application Priority Data

Apr. 6, 2000 (GB) ............................................. 0008553

(51) Int. Cl.[7] .......................... B29C 45/08; B29C 45/16

(52) U.S. Cl. .......................... 264/71; 265/69; 265/245; 265/255; 265/328.8; 265/328.11; 265/328.12

(58) Field of Search ........................... 264/69, 71, 245, 264/246, 247, 255, 295, 328.8, 328.11, 328.12, 328.1; 425/130, 573, 574, 575, 576; 510/141, 294, 447, 480–481

(56) References Cited

U.S. PATENT DOCUMENTS

| | | | | | |
|---|---|---|---|---|---|
| 2,418,856 | A | | 4/1947 | Stacey | |
| 3,676,538 | A | * | 7/1972 | Patterson | 264/75 |
| 3,884,605 | A | * | 5/1975 | Grelon | 425/131.1 |
| 3,890,419 | A | * | 6/1975 | Kaniecki | 264/173.12 |
| 3,899,566 | A | * | 8/1975 | Murray | 264/245 |
| 4,017,574 | A | * | 4/1977 | Joshi | 510/146 |
| 4,041,119 | A | * | 8/1977 | Fischer | 264/75 |
| 4,094,946 | A | * | 6/1978 | Finkensiep et al. | 264/148 |
| 4,096,221 | A | * | 6/1978 | Fischer et al. | 264/75 |

(Continued)

FOREIGN PATENT DOCUMENTS

| | | |
|---|---|---|
| DE | 1767673 | 6/1967 |
| GB | 1 387 601 | 3/1975 |
| GB | 1437323 | 5/1976 |
| GB | 1 470 540 | 4/1977 |
| GB | 1 487 187 | 9/1977 |
| GB | 1 588 785 | 4/1981 |
| GB | 2 124 968 | 2/1984 |
| WO | 98/53038 | 11/1998 |
| WO | 98/53039 | 11/1998 |
| WO | 00/53038 | 9/2000 |
| WO | 00/53039 | 9/2000 |

OTHER PUBLICATIONS

UK Search Report / Application No. GB 0008553.0 / Oct. 20, 2000.

International Search Report PCT/EP 01/03601 dated Jul. 10, 2001, 4 pp. Derwent DE 3036064A.

*Primary Examiner*—Angela Ortiz
(74) *Attorney, Agent, or Firm*—Alan A. Bornstein

(57) ABSTRACT

In an apparatus and process for manufacturing a detergent bar, the bar comprises a first distinct zone comprising a first component and at least a second distinct zone comprising a second component. In an injection step, the first and second components are injected into the mold cavity via nozzle means having a first orifice through which the first component is injected. The second component is injected through a second orifice of the nozzle means. The first and second components solidify in the cavity to form the bar. The interface between the zones may be non-planar and/or such that the zones cannot be separated by a unidirectional cut. The first and second zones may respectively comprise detergent and a benefit agent. The first and second zones may differ in texture.

18 Claims, 2 Drawing Sheets

U.S. PATENT DOCUMENTS 4,162,288 A * 7/1979 Hunt et al. .................. 264/75
4,196,163 A * 4/1980 Finkensiep et al. ......... 264/148
4,222,979 A * 9/1980 Hunt et al. .................. 264/75
4,224,266 A * 9/1980 Hunt et al. .................. 264/75
4,304,745 A * 12/1981 Alderson et al. ............ 264/75
4,318,878 A * 3/1982 Hornig ....................... 510/146
4,504,433 A * 3/1985 Inui et al. .................. 510/146
4,732,724 A 3/1988 Sterner
4,834,545 A 5/1989 Inoue et al.
5,217,639 A * 6/1993 Mottola ...................... 510/146
5,316,712 A * 5/1994 Ono et al. .................. 264/102
5,628,950 A * 5/1997 Schrenk et al. ............. 264/241
5,672,300 A 9/1997 Schurig et al.
5,703,025 A * 12/1997 Zyngier et al. ............. 510/147
5,786,311 A * 7/1998 Zyngier et al. ............. 510/147
6,147,040 A * 11/2000 van der Hagen ............ 510/146

* cited by examiner

Stripe

1/2 Turn

Multiple turns

Multiple turns

Waves

Waves

Feathered spiral

Wave crest

PROCESS FOR THE PRODUCTION OF A DETERGENT BAR

FIELD OF THE INVENTION

The present invention relates to a process and apparatus for forming detergent bars and detergent bars formed by that process. The detergent bars can for example be of the personal wash and/or care type, laundry type (e.g. for the washing or other treatment of textile fabrics), or household care type (e.g. hand dishwash).

BACKGROUND OF THE INVENTION

Detergent bars have conventionally been manufactured by one of two methods. The first of these is the so-called extrusion process in which a pre-formed composition comprising all components of the bar is typically plodded, i.e. extruded through an eye-plate, to form a continuous "rod", and the continuous rod cut into smaller pieces of predetermined length, commonly referred to as "billets". These billets are fed through a stamper, or alternatively, and especially in the production of low cost non-soap detergent (NSD) bars, are merely given an imprint on one or more surfaces. Such embossing or imprinting may be achieved using a die of the same dimensions as the bar surface which is hit with force, such as a mallet, or a die in the shape of a roller.

Stamping of detergent bars from an extruded billet, using a die, is carried out to give the bars a reproducible shape, smooth surface and/or to imprint a design such as a logo, trade mark or similar onto at least part of a surface of the bar. Stampers typically have a die formed in two halves each with a surface that contacts the billet during the stamping operation. These surfaces are adapted to close to a pre-set separation distance, thereby compressing the billet between the die halves to give the bar its final shape and appearance, and then separate. Excess composition is squeezed out from the die halves as they close. This is commonly referred to as the "flash". The flash is then separated from the soap bar by transferring the bar through holes in a "deflashing plate". Flash can account for up to 40% of the billet material and is generally recycled upstream of the extruder.

The second conventional method for the manufacture of detergent bars is casting. In casting, detergent compositions, in a heated, mobile and readily pourable state, are introduced into the top of an enclosed cavity (i.e. a mould) of the desired shape and the temperature of the composition reduced until it solidifies. The bar can then be removed by opening the mould.

Recently, a new technique for production of detergent bars has been devised. This is an injection moulding process and is disclosed in WO-A-00/53038 and WO-A-00/53039. Unlike the casting process where the composition is introduced into the mould as a readily pourable liquid prior to cooling, in the injection moulding process, the composition is introduced by application of pressure, preferably as a viscous liquid or paste. In the casting technique, the composition cools in the mould and some of the constituents form a solid structure, providing the final bar shape. With injection moulding, the composition is typically made viscous by being partially structured before it enters the mould. This can be effected either by partial pre-cooling of a hot substantially unstructured free flowing composition or by application of heat to partially destructure a solid or semi-solid composition. The partially structured composition is a non-Newtonian fluid and when pressure-injected into the mould it is thereby subjected to shear. This effect is preferably minimised. Inside the mould, upon further cooling the solidification process is completed.

As with most consumer products, the demand for diversity in product form and improvement in product qualities continues to increase. For these reasons, there is a need for robust, commercially viable processes for manufacturing good quality detergent bars comprising two or more different components (e.g. compositions or ingredients, colours etc.), present in the bar as distinct zones (e.g. stripes, swirls etc.).

Typically, the extrusion process is used to produce bars which are homogeneous with respect to the distribution of components. This is because of the nature of the process. A particulate feed is compressed and conveyed by an extruder, and subsequently extruded as a continuous rod. By the introduction of particulates of different colours to the extruder or by the injection of dye into the extruder or into the cone at the end of it, the extrusion process can be used to obtain bars with a marbled or striated effect.

The technique of coextrusion is also known, where two or more extruded process streams are passed together through a die orifice thereby forcing the two streams together. This produces a bi- or multi-colour billet. The resulting billet is then stamped to give a two-zone bar. The process streams must be sufficiently soft and sticky to ensure good mutual adhesion and yet sufficiently "solid" to allow ready conveyance and feeding of the billets to the stamper.

Up to now, the injection moulding process has not been used to produce striped, variegated or zoned bars.

The co-extrusion process generally produces zoned billets with a planar interface between the zones aligned along the axis of extrusion. On stamping, the planar surface will remain but may be angled with respect to the bar surface by appropriate orientation of the cutter and/or dies. If the two streams do not "weld" sufficiently well, this can result in cleavage planes within the bar, which can ultimately lead to bars splitting in use. Moreover, the opportunity for varying the resultant decorative effects are clearly limited.

Other problems experienced with stamping processes, are poor release of the bars from the dies and die-blocking. In die-blocking, small amounts of residual detergent left on dies builds up during continued use, which can result in visible imperfections on the bar surface. Die-blocking can also lead to poor or even non-release of the bars from the die surface.

The stamping process can also lead to undesirable distortions of, for example, the striped or variegated pattern present in the billet as the material is stamped. In addition, unlike with the manufacture of "homogeneous" bars, it is unlikely that the flash material generated in the stamping of a striped or variegated billet can be recycled back into the process, which adds considerably to the production costs.

Casting can be used to produce bars comprising different components in distinct zones of the bar. However, the variety of bar forms that can be produced is very limited and the process can be expensive to operate. Typically, a first component has to be poured into the mould and allowed to solidify before a second component is added. Clearly this is awkward, time-consuming and only allows for a limited number of bar forms to be manufactured.

In order to be castable, the formulation must be mobile and readily pourable at the elevated temperatures employed. Certain detergent formulations are viscous liquids or semi-solids at commercially realistic temperatures and therefore do not lend themselves to casting. Furthermore, in the casting process, the detergent melt tends to cool slowly and unevenly. This can lead to unwanted structural orientations and segregation of ingredients. Often some sort of active cooling system is employed in order to achieve acceptable processing times. Even when a cooling system is employed, cooling is still generally uneven through the detergent composition in the mould.

A major problem with the casting process in general, is that detergent compositions in the moulds tend to shrink as they cool. This is highly undesirable as the mould is intended to impart a distinctive shape to the bar and/or a logo of some kind. Shrinkage can take the form of dimples, wrinkles or voids, or a depression at the fill point of the bar.

One or more of the aforementioned problems is now solved by the present invention by means of which dual- or multi-zoned bars are made by an injection moulding process in which respective components are injected into a mould via separate respective orifices.

DEFINITION OF THE INVENTION

Thus, a first aspect of the invention provides a process for manufacturing a detergent bar comprising a first distinct zone comprising a first component and at least a second distinct zone comprising a second component, said process comprising an injection step in which said first and second components are injected into a cavity of a mould via nozzle means having a first orifice through which said first component is injected and at least a second orifice through which the second component is injected, and a solidification step in which the first and second components solidify in the cavity to form the said detergent bar.

The present invention also extends to an apparatus for effecting the above process according to the first aspect of the invention. Thus, a second aspect of the invention provides an apparatus for manufacturing a detergent bar comprising a first distinct zone comprising a first component and at least a second distinct zone comprising a second component, said apparatus comprising a mould having an internal cavity and nozzle means for injecting said first and second components into the cavity, the nozzle means having a first orifice through which said first component is injected and a second orifice through which said second component is injected, whereby the injected first and second components solidify in the cavity to form the said detergent bar.

DETAILED DESCRIPTION OF THE INVENTION

The present invention is based on use of an injection moulding process for the manufacture of detergent bars. Further details of suitable injection moulding techniques are given below. However, the minimum requirement for the process and apparatus according to the present invention is use of equipment comprising a mould and nozzle means having two or more orifices (e.g. nozzles) for separate injection of the respective components.

Preferably, the nozzle means is inserted inside the cavity through an opening in the mould, before injection commences. Then, it is withdrawn during injection. Withdrawal may be effected by moving the nozzle means relative to the mould or by moving the mould relative to the nozzle means, or both.

There are two ways in which the pattern of the two or more components may be varied during manufacture. The first is by controlling the relative motion between the nozzle means and the mould. The second is by varying the relative rates of injection of the different components. Either or both of these techniques may be employed.

Regarding control of the relative motion between the nozzle means and the mould, in the simplest form this may entail controlling the withdrawal of the nozzle means from the mould cavity. For example, this may be done in a progressive or interrupted manner and speed of withdrawal may be varied during all part of the injection step. Additionally or alternatively, control of the relative motion between the nozzle means and the mould may be in the form of a rotary motion, rotation being around the axis of withdrawal of the nozzle means. Such relative motion may be effected by movement of the nozzle means and/or the mould itself. Rotary motion may be continuous and/or oscillatory. It may be continuous throughout the period of injection or may be intermittent and the speed and/or type of rotary motion may be changed as desired.

Similarly, the injection rates of the different components may be varied independently of one another throughout the injection step and injection of one or more components may optionally be stopped from time to time during the injection step. This can, for instance, be used to produce a three zone bar using only two nozzles. Injection of a first component can be stopped and injection of a third component started through the same nozzle. It is, however, essential that for at least part of the process at least two streams are injected simultaneously.

The solidification step does not have to commence only after the injection step is complete, in many cases there will be temporal overlap, that is to say that solidification of injected material inside the mould will have begun before the mould cavity is completely full.

The Bar

By "detergent bar" is meant a tablet, cake or bar which contains a surface active agent in at least one distinct zone of the bar. The amount of surface active agent, which comprises soap, synthetic detergent active or a mixture thereof, is preferably at least 5% by weight of the component making up at least one distinct zone, and more preferably at least 5% by weight of the bar. The detergent bar may also comprise benefit agents for imparting or maintaining desirable properties to the skin and/or keratinic fibres, e.g. hair. For example, moisturising agents and/or hair conditioning agents may be included.

By "distinct zone" is meant a three dimensional region of the bar which is substantially homogenous throughout. This is as opposed to bars in which a second component is dispersed in the form of separate flakes or droplets, or intermingled, for example in a marbled fashion.

The zones of the bar may differ from one another in terms of their chemical composition and/or colour.

In the case of different colours, the simplest arrangement is where one zone is formed of a component to which a colorant has been added and the remainder of the bar is uncoloured. Obviously, this will often be done for reasons of aesthetic consumer appeal.

The zones may comprise respective different chemical components, for example, for reasons of mutual incompatibility. It may be convenient to have differing chemical components between the zones but also to provide different colourations to reinforce the multi-component concept to the consumer.

Differing chemical components, could, for example, be different detergent components such as, a soap and a synthetic non-soap surfactant. However, it is an especially preferred variant to provide at least one zone containing a detergent (soap or non-soap synthetic surfactant) and another zone or zones containing a benefit agent. Details of suitable benefit agents are described further, hereinbelow.

It has also been found that for performance reasons, it is especially advantageous to keep benefit agents and detergent ingredients in separate zones, preferably each zone comprising one of these ingredients and substantially excluding the other. Thus, a third aspect of the present invention comprises a detergent bar comprising a first distinct zone and at least a second distinct zone adjoining said first distinct zone at an interface, said first zone comprising a detergent material and said second zone comprising a benefit agent.

Although the process of the present invention is capable of producing a bar with distinct zones which are separated by a single longitudinal planar interface, as would be produced by the co-extrusion process, it is capable of producing much more complex zone patterns which cannot be produced by prior art processes.

Thus, for example, the process of the present invention can be used to produce bars with non-planar interface(s) between the zones.

Further, the process of the present invention is capable of providing bars having two or more zones which cannot be separated by a uni-directional cut (i.e. a uni-directional cut could not yield separate parts, each comprising or substantially comprising only one component).

Further, the zones of the bar do not have to differ from each other in colour and/or composition. They can differ from each other in texture, without the need for dosing a separate texturing agent to one or more of the components. Instead, this may be done by injecting one of the components in a differing Theological condition. This texture difference may for example manifest itself as different surface finish and/or consumer perceived "feel".

For the avoidance of doubt, the interface between the zones may be exposed on at least part of the external surface of the bar before first use, or it may be below the surface, depending on the configuration of the nozzle means and/or the relative motions of the nozzle means and mould and/or injection rate(s) of the components.

The Injection Moulding Apparatus

In general, the apparatus and techniques for injection moulding to carry out the present invention are preferably any of those described in WO-A-00/53038 and WO-A-00/53039, but with a dual or multi-orifice nozzle means. However, any injection moulding process is suitable, adapted to have a dual or multi-orifice head. Injection moulding is a process which is presently particularly used in the moulding of synthetic polymeric thermoplastic articles, particularly thermoplastic articles having thin cross sections and complex shapes.

In essence, an injection moulding apparatus comprises a substantially closed mould and a means for delivering the material to be moulded, under raised pressure into the mould. Preferably there are means for raising the temperature of the material to a temperature where the material is flowable under pressure. The process of the present invention can be carried out using such known injection moulding apparatus, with or without any means for heating the feed. Various modifications to such apparatus for rendering it suitable for production of detergent bars are described in detail in WO-A-00/53038 and WO-A-00/53039 and are equally applicable to the present invention when the injection head is adapted to have two or more nozzles.

For example, such apparatus will usually comprise injector head means for applying pressure to the detergent composition so as to drive the detergent composition into a mould via the nozzle means. The apparatus must, however, be configured to keep the respective streams of the different components separate from each other.

Suitable types of equipment that lend themselves to driving the components into the mould include positive displacement pump-type arrangements such as, for example, piston pump (which can include reciprocating extruders), gear pump and lobe pump-type arrangements. A typical commercially available example is a simple ram extruder in contact with a mould. Such apparatus typically comprises a reservoir or barrel for the injected components, a plunger for applying pressure to the material in the reservoir and an exit port through which the components are driven, directly or indirectly, into a mould. Simple ram extruder apparatus is particularly suited to injection moulding of materials in, for example, a semi-solid form.

Any suitable method may be used to control the temperature of the components being injected into the mould. They may be supplied at a temperature suitable for delivery to the mould and require no alteration to their temperature. Alternatively, and preferably, the temperature of the materials is altered before or whilst it is fed to the mould by using heating or cooling means to raise or lower the temperature of the composition as is appropriate. Most preferably, the state of the components is altered before or whilst it is fed. For example, it may pass from a liquid phase to a semi-solid state. Alternatively, it may pass from a solid to a semi-solid state.

Suitable heating and cooling means are well-known to the skilled person in the art. For example, a suitable cooling means is a cooling jacket containing a cooling medium, and suitable heating means include, for example, electrical heating jackets containing a heating medium or heat exchangers of various forms.

Some components may be produced and supplied in a high temperature, molten state. In that case, means for feeding liquid components to the means for applying pressure to the detergent composition will be required.

Examples of suitable feeding means include a conveyor, a container with a tapering lower section, an agitator, a ram feeder, a screw feeder or any number thereof in any combination.

The Nozzle Means

The present invention is not limited to production of detergent bars having only two distinct zones. There may be three or more such zones. The nozzle means will have at least two orifices and preferably the same number of orifices as zones.

According to the desired patterning of zones, the positioning of the orifices may be in any appropriate mutual arrangement. For example side-by-side, spaced apart or concentric. This may be embodied in a number of different ways. For example, the nozzle means preferably comprises a single (usually, generally elongate) nozzle. The nozzle may have the respective orifices disposed at or near its inlet end, so that the streams of the components travel together along substantially the entire nozzle length to its outlet end. Alternatively, the orifices may be positioned at or near the outlet end so that the streams of components travel along separate passages within the nozzle and only come into mutual contact as, or after, they enter the mould cavity. The orifices may also be positioned part-way along the nozzle length with respective passages terminally in the orifices extending along only part of the nozzle length. Then, the streams come into mutual contact at an interim position during their transit through the nozzle.

It is also possible for the nozzle means to comprise a dual- or multi-passage nozzle with orifices arranged to release respective components at different positions along the nozzle.

Another arrangement is for the nozzle means to comprise a plurality of nozzles. These, for example, may independently have any form described above in respect of a single nozzle.

The injector head may be connected to the nozzle means by a simple passages for the respective components, or passages having non-return means or connections for bypass ducts, to allow quick withdrawal of the nozzle means after the mould is filled and smooth operation of the apparatus.

In a preferred embodiment, however, the detergent composition is fed through nozzle means in the form of dual- or multi-path nozzle, terminating in the respective orifices, whose length is a significant proportion (at least half, preferably at least three quarters) of the length of the internal volume of the mould.

Where the respective components are already prepared in different forms (e.g. differing from each other in colour and/or chemical composition and/or Theological condition), they will be fed to the nozzle means as separate feed streams. However, in some cases, a single stream feed may be fed to a splitter somewhere along the feed path, where it is split into two or more streams. Then one or more additives may be selectively fed to only one of these streams or different additives may be fed to different streams, or one or more of the streams may have its Theological condition varied. This could even occur at the nozzle means itself where the single stream would be split into separate passages of a single nozzle or into separate nozzles. Where there are three or more streams, the permutations on this theme will readily be apparent to those skilled in the art.

The nozzle means may also be heated or pre-heated in order, for example, to prevent any of the detergent composition solidifying (depositing) in the nozzle means and thus inhibiting smooth delivery of the composition to the mould.

The Mould

The mould may be constructed of any suitable material, for example a rigid material with good mechanical strength. Where rapid cooling is desired, a material with high thermal conductivity and/or a high coefficient of thermal expansion may be preferred. Preferably the mould comprises a material selected from metals and their alloys (for example, aluminium, brass and other copper alloys, steels including carbon and stainless steel), sintered forms of metals or metal composites, non-metallic materials such as ceramics, composites, and thermosetting plastics in porous or foamed forms.

The mould may be pre-cooled or preheated prior to delivery of injected components to the mould. The internal surface of the mould may be preheated to a temperature, for example, in excess of the delivery temperature and/or the melt temperature of the composition. Such preheating of the mould has been found to provide for a smoother, more glossy finish to the bars.

After delivery of detergent, the mould may be cooled to encourage rapid solidification of the bar. Any suitable coolant may be used, e.g. air, water, ice, solid carbon dioxide or combinations thereof, depending on the speed of cooling and the end temperature required. Preferably, at least part of the external face of the mould is provided with a means to improve cooling efficiency of the mould after injection. In preferred embodiments of the invention, such means comprise fins or ribs for air cooling or jackets for circulation of a coolant liquid.

The mould suitably comprises at least two rigid complementary dies adapted to be fitted to each other and withstand the injection and holding pressure, each die corresponding to a respective portion of the desired shape of moulded article, said dies when in engagement along the contacting portion of their rims defining a cavity corresponding to the total shape of the moulded article. The use of multiple part moulds comprising at least two die parts allows for the manufacture of highly diverse 3-dimensional shapes; for example circular, oval, square, rectangular, concave or any other form as desired.

Other Apparatus Features

In injection moulding processes it is generally necessary to provide a means for venting, i.e. removal of air from the mould, as the mould is filled. Mould venting is a technique employed in various known injection moulding processes, for example in the thermoplastics industry, and such techniques may also be suitably employed in the present invention as would be understood by the man skilled in the art.

A preferred method of venting the mould is to provide a passage associated with the nozzle means which connect the interior of the mould with the exterior, thus allowing gas to escape. The passage may be formed by a flute or flutes on the exterior of the nozzle means or it may be formed internally with an opening in the nozzle means inside the mould, and another outside the mould, connected by a channel inside the mould. Alternatively, the channel may be provided in the orifice through which the nozzle means enters the mould. Alternatively, the nozzle means may be a loose fit in this orifice, preferably along part of its length, allowing gas to escape the mould.

We may also claim any apparatus according to the second aspect of the invention, further comprising respective means for effecting any one or more of preferred process features claimed or generically or specifically described herein.

The Injected Components

The injected components which solidify in the mould to form the bar may have a wide variety of forms and compositions, depending on the intended product form. They may also in addition differ in Theological state (e.g. temperature and/or viscosity) for example to give differing texture or surface finishes to the respective zones. However, at least one of these must contain a detergent. As mentioned above, they may be prepared as separate feedstocks or during the process, a single feed may be split into two or more streams which are selectively post-dosed (or not), as appropriate.

In a preferred embodiment, at least one (but most preferably both or all) of the injected components is/are preferably at least partially structured when delivered to the mould. Preferably, such components are in the viscous, paste semi-solid form when delivered to the mould. Of course, the present invention also provides for one or more of the injected components to be injection moulded in a substantially fluid form. For example, some decoration effects are achieved by injecting one or more components as free flowing fluids.

It is important to note that in the case when one or more components are injected with a viscosity above that of a free-flowing fluid, the present invention is not limited to partial structuring as the sole means of thickening, since other thickeners may be employed in addition, or in the alternative.

It is preferred that at least one, more preferably all of the components have a viscosity of at least 1 Pa. s., whether that is brought about by part structuring and/or other means. The viscosity of the component in question, at the injection conditions (temperature, shear rate etc), may be determined using a Haake viscometer. This comprises a stationary cylindrical cup containing the material to be tested, in which a cylindrical "bob" is rotated. The speed of rotation is increased in stages, and the torque required to drive the bob recorded. This gives a measure of stress on the material, against the shear rate applied to at. The viscosity of the sample is the ratio of these. Measurements are made at a single temperature, maintained by a jacket around the cup.

It is appropriate to use a SVIIP type cup, which is ridged, to try and avoid slip. The temperature measurement is recorded at the start of each run, using a thermocouple inserted directly in the sample as an offset error from the water bath used to heat the jacket can occur.

Cold sample material is put in the cup, and allowed to heat over an hour or more. The bob is then gently rotated to ensure all air is removed from the sample. The material can then be tested.

For each sample temperature, the shear rate should typically increase in steps: 0.1, 0.3, 1, 3, 10, 30, 100 $s^{-1}$ and 20 data points recorded at each shear rate. It is preferable for the "raw" data to be viewed by an experienced rheologist to identify any points where the data may be suspect.

Some compositions may be made permanently sticky if they are injection moulded under the wrong conditions. That is, some solid detergent compositions have a complex molecular structure which may be disrupted if the solid is exposed to excessive shearing stresses. The molecular structure may not be re-established after such shearing, so that the detergent composition will remain in a sticky, unusable state.

Structure

Where components are to be injected in partly structured form, and they are compared with a detergent composition which is at the same temperature as the respective components under consideration and of substantially the same composition, except for having no structure and/or structuring agent present, their viscosity will be found to be increased.

Structure (including part structuring) can be provided, for example, by liquid crystal formation, a polymeric structuring agent or clay, or a sufficient volume of a dispersed solid component which will affect the viscosity. A solid component can provide structure by interacting to form a network within the detergent composition or through the simple physical interaction/contact of the solid particles with one another or with the continuous phase.

With regard to components which are in a substantially fluid or liquid state, there are two general and separate classes of compositions, those with structurally isotropic phases and those with structurally anisotropic phases. Those phase states that are structurally isotropic are liquid, cubic liquid crystal phases and cubic crystal phases. All other phases are structurally anisotropic.

Structured liquids can be "internally structured", whereby the structure is formed by primary ingredients, preferably by surfactant material (i.e. anisotropic or having liquid crystal phases), and/or "externally structured" whereby a three dimensional matrix structure is provided by using secondary additives, for example, polymers (e.g. Carbopols), clay, silica and/or silicate material (including in situ formed aluminosilicates). Such secondary additives may be present at a level of 1–10% by weight of the detergent composition.

Other details of possible means of structuring the injected components are described in WO-A-00/53038 and WO-A-0053039.

Compositions

As mentioned above, at least one component must contain a detergent ingredient. Another preferred ingredient is a benefit agent. As already mentioned, for some product forms, it is especially preferred to keep detergents and benefit agents separate from each other in respective discrete zones.

Detergent Formulations

At least one injected component must comprise a detergent. This will be chosen according to the intended end-use of the bar.

(a) Personal Wash and Care Bars

Suitable detergent compositions for injection moulding include the following ingredients:

(A) 0–75%, e.g. 10–60% by weight of a synthetic, non-soap detergent (B) 0–60% by weight of a water soluble structurant which has a melting point in the range 40–100° C., (C) 0–60%, e.g. 5–60% by weight of a water insoluble structurant which has a melting point in the range 40–100° C., (D) 0–25% by weight water, (E) 0–20% by weight total composition one or more amphoteric and/or zwitterionic surfactants, (F) 0–20% by weight total composition one or more nonionic surfactants, (G) 0–90% by weight soap, (H) Other optional ingredients as described below, (I) 0–10% by weight total electrolyte.

Suitable synthetic detergents for use in the process of the present invention include anionic surfactants such as $C_8$–$C_{22}$ aliphatic sulphonates, aromatic sulphonates (e.g. alkyl benzene sulphonate), alkyl sulphates (e.g. $C_{12}$–$C_{18}$ alkyl sulphates), alkyl ether sulphates (e.g. alkyl glyceryl ether sulphates).

Suitable aliphatic sulphonates include, for example, primary alkane sulphonate, primary alkane disulphonate, alkene sulphonate, hydroxyalkane sulphonate or alkyl glyceryl ether sulphonate (AGS).

Other anionic surfactants that can also be used include alkyl sulphosuccinates (including mono- and dialkyl, e.g. $C_6$–$C_{22}$ sulphosuccinates), alkyl and acyl taurates, alkyl and acyl sarcosinates, sulphoacetates, alkyl phosphates, alkyl phosphate esters, alkoxyl alkyl phosphate esters, acyl lactates, monoalkyl succinates and maleates, sulphoacetates.

Another surfactant which may be used are the acyl isethionates (e.g. $C_8$–$C_{18}$). These esters are prepared by reaction between alkali metal isethionate with mixed aliphatic fatty acids having from 6 to 18 carbon atoms and an iodine value of less than 20. At least 75% of the mixed fatty acids have from 12 to 18 carbon atoms and up to 25% have from 6 to 10 carbon atoms.

The acyl isethionate may be an alkoxylated isethionate such as is described in U.S. Pat. No. 5,393,466.

The anionic surfactants used are preferably mild, i.e. a surfactant which does not damage the stratum corneum, the outer layer of the skin. Harsh surfactants such as primary alkane sulphonate or alkyl benzene sulphonate will generally be avoided.

The synthetic detergents of the present invention may also comprise cationic surfactants, especially cationic surfactants suitable for use in treating hair and other keratinic material.

A cationic polymer is a preferred ingredient in shampoo compositions of the invention, for enhancing conditioning performance of the shampoo. Typically such a polymer enhances deposition of conditioning components such as silicone from the shampoo composition onto the intended site during use, i.e. the hair and/or the scalp.

The cationic polymer may be a homopolymer or be formed from two or more types of monomers. The molecular weight of the polymer will generally be between 5 000 and 10 000 000, typically at least 10 000 and preferably in the range 100 000 to about 2 000 000. The polymers will have cationic nitrogen containing groups such as quaternary ammonium or protonated amino groups, or a mixture thereof.

The cationic nitrogen-containing group will generally be present as a substituent on a fraction of the total monomer units of the cationic polymer. Thus when the polymer is not a homopolymer it can contain spacer non-cationic monomer units. Such polymers are described in the CTFA Cosmetic Ingredient Directory, 3rd edition. The ratio of the cationic to non-cationic monomer units is selected to give a polymer having a cationic charge density in the required range.

Suitable cationic polymers include, for example, copolymers of vinyl monomers having cationic amine or quaternary ammonium functionalities with water soluble spacer monomers such as (meth)acrylamide, alkyl and dialkyl (meth)acrylamides, alkyl (meth)acrylate, vinyl caprolactone and vinyl pyrrolidine. The alkyl and dialkyl substituted monomers preferably have C1–C7 alkyl groups, more preferably C1–3 alkyl groups. Other suitable spacers include vinyl esters, vinyl alcohol, maleic anhydride, propylene glycol and ethylene glycol.

The cationic amines can be primary, secondary or tertiary amines, depending upon the particular species. In general secondary and tertiary amines, especially tertiary, are preferred.

Amine substituted vinyl monomers and amines can be polymerized in the amine form and then converted to ammonium by quaternization.

The cationic polymers can comprise mixtures of monomer units derived from amine- and/or quaternary ammonium-substituted monomer and/or compatible spacer monomers.

Suitable cationic polymers include, for example:

- copolymers of 1-vinyl-2-pyrrolidine and 1-vinyl-3-methyl-imidazolium salt (e.g. chloride salt), referred to in the industry by the Cosmetic, Toiletry, and Fragrance Association, (CTFA) as Polyquaternium-16. This material is commercially available from BASF Wyandotte Corp. (Parsippany, N.J., USA) under the LUVIQUAT tradename (e.g. LUVIQUAT FC 370);
- copolymers of 1-vinyl-2-pyrrolidine and dimethylaminoethyl methacrylate, referred to in the industry (CTFA) as Polyquaternium-11. This material is available commercially from Gaf Corporation (Wayne, N.J., USA) under the GAFQUAT tradename (e.g., GAFQUAT 755N);
- cationic diallyl quaternary ammonium-containing polymers including, for example, dimethyldiallyammonium chloride homopolymer and copolymers of acrylamide and dimethyldiallylammonium chloride, referred to in the industry (CTFA) as Polyquaternium 6 and Polyquaternium 7, respectively;
- mineral acid salts of amino-alkyl esters of homo-and co-polymers of unsaturated carboxylic acids having from 3 to 5 carbon atoms, (as described in U.S. Pat. No. 4,009,256 (National Starch));
- cationic polyacrylamides(as described in WO95/22311 (Unilever)).

Other cationic polymers that can be used include cationic polysaccharide polymers, such as cationic cellulose derivatives, cationic starch derivatives, and cationic guar gum derivatives.

Cationic polysaccharide polymers suitable for use in compositions of the invention include those of the formula:

$$A—O—[R—N^+(R^1)(R^2)(R^3)X^-],$$

wherein: A is an anhydroglucose residual group, such as a starch or cellulose anhydroglucose residual. R is an alkylene, oxyalkylene, polyoxyalkylene, or hydroxyalkylene group, or combination thereof. $R^1$, $R^2$ and $R^3$ independently represent alkyl, aryl, alkylaryl, arylalkyl, alkoxyalkyl, or alkoxyaryl groups, each group containing up to about 18 carbon atoms. The total number of carbon atoms for each cationic moiety (i.e., the sum of carbon atoms in $R^1$, $R^2$ and $R^3$) is preferably about 20 or less, and X is an anionic counterion.

Cationic cellulose is available from Amerchol Corp. (Edison, N.J., USA) in their Polymer JR (trade mark) and LR (trade mark) series of polymers, as salts of hydroxyethyl cellulose reacted with trimethyl ammonium substituted epoxide, referred to in the industry (CTFA) as Polyquaternium 10. Another type of cationic cellulose includes the polymeric quaternary ammonium salts of hydroxyethyl cellulose reacted with lauryl dimethyl ammonium-substituted epoxide, referred to in the industry (CTFA) as Polyquaternium 24. These materials are available from Amerchol Corp. (Edison, N.J., USA) under the tradename Polymer LM-200.

Other suitable cationic polysaccharide polymers include quaternary nitrogen-containing cellulose ethers (e.g. as described in U.S. Pat. No. 3,962,418 (Procter & Gamble)), and copolymers of etherified cellulose and starch (e.g. as described in U.S. Pat. No. 3,958,581).

A particularly suitable type of cationic polysaccharide polymer that can be used is a cationic guar gum derivative, such as guar hydroxypropyltrimonium chloride (Commercially available from Rhone-Poulenc in their JAGUAR trademark series).

Preferably the cationic polymer is selected from cationic cellulose and cationic guar derivatives. Particularly preferred cationic polymers are JAGUAR C13S, JAGUAR C15, JAGUAR C17 and JAGUAR C16 and JAGUAR C162.

Suitable water soluble structurants include moderately high molecular weight polyalkylene oxides of appropriate melting point (e.g., 40 to 100° C., preferably 50 to 90° C.) and in particular polyethylene glycols or mixtures therefore. Polyethylene glycols (PEG's) which are used may have a molecular weight in the range 2,000 to 25,000. Also included are water soluble starches.

Suitable insoluble structurants are generally an unsaturated and/or branched long chain ($C_8$–$C_{24}$) liquid fatty acid or ester derivative thereof; and/or unsaturated and/or branched long chain liquid alcohol or ether derivatives thereof. It may also be a short chain saturated fatty acid such as capric acid or caprylic acid. Examples of liquid fatty acids which may be used are oleic acid, isostearic acid, linoleic acid, linolenic acid, ricinoleic acid, elaidic acid, arichidonic acid, myristoleic acid and palmitoleic acid. Ester derivatives include propylene glycol isostearate, propylene glycol oleate, glyceryl isostearate, glyceryl oleate and polyglyceryl diisostearate.

Examples of alcohols include cetyl alcohol, stearyl alcohol, cetearyl alcohol, behenyl alcohol, arachydyl alcohol, oleyl alcohol and isostearyl alcohol and mixtures thereof. Examples of ether derivatives include isosteareth or oleth carboxylic acid; or isosteareth or oleth alcohol.

Zwitterionic surfactants suitable for use in formulations are exemplified by those which can be broadly described as derivatives of aliphatic quaternary ammonium, phosphonium, and sulphonium compounds, in which the aliphatic radicals can be straight or branched chain, and wherein one of the aliphatic substituents contains from about 8 to about 18 carbon atoms and one contains an anionic group, e.g. carboxy, sulphonate, sulphate, phosphate, or phosphonate.

Amphoteric detergents which may be used in this invention include at least one acid group. This may be a carboxylic or a sulphonic acid group. They include quaternary nitrogen and therefore are quaternary amido acids. They should generally include an alkyl or alkenyl group of 7 to 18 carbon atoms. Suitable amphoteric detergents include simple betaines or sulphobetaines.

Amphoacetates and diamphoacetates are also intended to be covered in possible zwitterionic and/or amphoteric compounds which may be used.

In addition to one or more anionic and amphoteric and/or zwitterionic, the surfactant system may optionally comprise a nonionic surfactant at a level of up to 20% by weight.

The nonionic which may be used includes in particular the reaction products of compounds having a hydrophobic group and a reactive hydrogen atom, for example aliphatic alcohols, acids, amides or alkyl phenols with alkylene oxides, especially ethylene oxide either alone or with propylene oxide. Specific nonionic detergent compounds are alkyl ($C_6$–$C_{22}$) phenols-ethylene oxide condensates, the condensation products of aliphatic ($C_8$–$C_{18}$) primary or secondary linear or branched alcohols with ethylene oxide, and products made by condensation of ethylene oxide with the reaction products of propylene oxide and ethylenediamine. Other so-called nonionic detergent compounds include long chain tertiary amine oxides, long chain tertiary phosphine oxides and dialkyl sulphoxides.

The nonionic may also be a sugar amide, such as a polysaccharide amide. Specifically, the surfactant may be one of the lactobionamides described in U.S. Pat. No. 5,389,279 which is hereby incorporated by reference or it may be one of the sugar amides described in U.S. Pat. No. 5,009,814.

Other surfactants which may be used are described in U.S. Pat. No. 3,723,325 and alkyl polysaccharide nonionic surfactants as disclosed in U.S. Pat. No. 4,565,647.

The nonionic surfactant can also be a water soluble polymer chemically modified with hydrophobic moiety or moieties. For example, EO-PO block copolymer, hydrophobically modified PEG such as POE(200)-glyceryl-stearate can be included in the formulations claimed by the subject invention.

Formulations can furthermore optionally contain up to 90% soap made by normal soap making procedures. For example, the products of saponification of natural material such as tallow, coconut oil, palm oil, rice bran oil, fish oil or any other suitable source of long chain fatty acids may be used. The soap may be neat soap or middle phase soap.

In addition, the compositions of the invention may include optional ingredients as follows:

Organic solvents, such as ethanol or propylene glycol; auxiliary thickeners, such as carboxymethylcellulose, magnesium aluminium silicate, hydroxyethylcellulose, methylcellulose, carbopols, glucamides, or Antil® from Rhone Poulenc; perfumes; sequestering agents, such as tetrasodium ethylenediaminetetraacetate (EDTA), EHDP or mixtures in an amount of 0.01 to 1%, preferably 0.01 to 0.05%; and colouring agents, opacifiers and pearlizers such as zinc stearate, magnesium stearate, $TiO_2$, EGMS (ethylene glycol monostearate) or Lytron 621 (Styrene/Acrylate copolymer); all of which are useful in enhancing the appearance or cosmetic properties of the product.

The compositions may further comprise antimicrobials such as 2-hydroxy-4,2'4' trichlorodiphenylether (DP300); preservatives such as dimethyloldimethylhydantoin (Glydant XL1000), parabens, sorbic acid etc.

The compositions may also comprise coconut acyl mono- or diethanol amides as suds boosters, and strongly ionising salts such as sodium chloride and sodium sulphate may also be used to advantage. Such electrolyte is preferably present and level between 0 and 5% by weight, preferably less than 4% by weight.

Antioxidants such as, for example, butylated hydroxytoluene (BHT) may be used advantageously in amounts of about 0.01% or higher if appropriate.

Cationic conditioners which may be used include Quatrisoft LM-200 Polyquaternium-24, Merquat Plus 3330—Polyquaternium 39; and Jaguar® type conditioners.

Polyethylene glycols which may be used include Polyox WSR-205 PEG 14M, Polyox WSR-N-60K PEG 45M, Polyox WSR-N-750 PEG 7M and PEG with molecular weight ranging from 300 to 10,000 Dalton, such as those marketed under the tradename of CARBOWAX SENTRY by Union Carbide.

Thickeners which may be used include Amerchol Polymer HM 1500 (Nonoxynyl Hydroethyl Cellulose); Glucam DOE 120 (PEG 120 Methyl Glucose Dioleate); Rewoderm® (PEG modified glyceryl cocoate, palmate or tallowate) from Rewo Chemicals; Antil® 141 (from Goldschmidt).

Clays and Paraffin Wax

Another optional ingredient which may be added are the deflocculating polymers such as are described in U.S. Pat. No. 5,147,576.

Another ingredient which may be included are exfoliants such as polyoxyethylene beads, walnut shells and apricot seeds The detergent compositions of the present invention may include typical known additives such as perfumes and colorants.

(b) Laundry Bars

For laundry bars intended for the washing of clothes, the bar will normally contain one or more detergent components commonly used in so-called non-soap detergent (NSD) fabrics washing bars. In the widest sense such detergent component may be chosen from one or more anionic, cationic, non-ionic, amphoteric and zwitterionic surface-active compounds and mixtures thereof. Many suitable surface-active compounds are available and are fully described in the literature, for example, in "Surface-Active Agents and Detergents", Volumes I and II, by Schwartz, Perry and Berch.

Additives and Benefit Agents

Personal Wash Bars

For improving the consumer-perceived properties of detergent bars intended for personal washing, it may be desirable to incorporate benefit agents and/or other additives into the formulation. Skin benefit agents are defined as products which may be included in a detergent composition which will be deposited onto the skin when the detergent composition is applied to the skin and which will impart or maintain desirable properties for the skin.

For some product forms it is particularly preferred that at least one of the injected components should comprise benefit agents.

Some benefit ingredients are substantially immiscible with the detergent composition and are desired to be present in the form of discrete zones. When the detergent composition is in a fluid state as in a casting process, any density differences between the benefit ingredients and the fluid component can lead to phase separation in the unstirred system such as would exist in a mould after casting. The benefit agent may exist as a single component phase or with some of the ingredients of the relevant component formulation.

One of the problems associated with benefit agents is that they are washed away by the lathering surfactants before they are deposited on the skin. One way to avoid this is to disperse benefit agents heterogeneously in the bar, e.g. as zones, allowing direct transfer of the benefit agent as the bar is rubbed on the skin. It is widely accepted that more benefit agent deposits on the skin when the benefit agent is dispersed heterogeneously.

Further, in order to give optimum deposition to the skin during the wash process, it may be desirable to control the size of the zones occupied by the benefit ingredient in the finished bar product.

Benefit agents include components which moisturise, condition or protect the skin. Suitable benefit agents include moisturising components, such as, for example, emollient oils. By emollient oil is meant a substance that softens the skin and keeps it soft by retarding the decrease of its water content and/or protects the skin.

Preferred benefit agents for personal wash bars include:

Silicone oils, gums and modifications thereof such as linear and cyclic polydimethylsiloxanes; amino, alkyl, alkylaryl and aryl silicone oils. The silicone oil used may have a viscosity in the range 1 to 100,000 centistokes.

Fats and oils including natural fats and oils such as jojoba, soyabean, rice bran, avocado, almond, olive, sesame, persic, castor, coconut, mink, arachis, corn, cotton seed, palm kernel, rapeseed, safflower seed and sunflower oils; cocoa butter, beef tallow, lard; hardened oils obtained by hydrogenating the aforementioned oils; and synthetic mono, di and triglycerides such as myristic acid glyceride and 2-ethylhexanoic acid glyceride;

Waxes such as carnauba, spermaceti, beeswax, lanolion and derivatives thereof;

Hydrophobic plant extracts;

Hydrocarbons such as liquid paraffins, petrolatum, microcrystalline wax, ceresin, squalene and mineral oil;

Higher alcohols and fatty acids such as behenic, palmitic and stearic acids; lauryl, cetyl, stearyl, oleyl, behenyl, cholesterol and 2-hexadecanol alcohols;

Esters such as cetyl octanoate, cetyl lactate, myristyl lactate, cetyl palmitate, butyl myristate, butyl stearate, decyl oleate, cholesterol isostearate, myristyl myristate, glyceryl laurate, glyceryl ricinoleate, glyceryl stearate, alkyl lactate, alkyl citrate, alkyl tartrate, glyceryl isostearate, hexyl laurate, isobutyl palmitate, isocetyl stearate, isopropyl isostearate, isopropyl laurate, isopropyl linoleate, isopropyl myristate, isopropyl palmitate, isopropyl stearate, isopropyl adipate, propylene glycol monolaurate, propylene glycol ricinoleate, propylene glycol stearate, and propylene glycol isostearate;

Essential oils such as fish oils, mentha, jasmine, camphor, white cedar, bitter orange peel, ryu, turpentine, cinnamon, bergamont, citrus unshiu, calamus, pine, lavender, bay, clove, hiba, eucalyptus, lemon, starflower, thyme, peppermint, rose, sage, menthol, cineole, eugeniol, citral, citronelle, borneol, linalool, geraniol, evening primrose, camphor, thymol, spirantol, pinene, limonene and terpenoid oils;

Lipids such as cholesterol, ceramides, sucrose esters and pseudo-ceramides as described in EP-A-556 957;

Vitamins such as vitamin A and E, and vitamin alkyl esters, including those vitamin C alkyl esters;

Suncreens such as octyl methoxyl cinnamate (Parsol MCX) and butyl methoxy benoylmethane )Parsol 1789);

Anti-wrinkle agents such as retinol A and alphahydroxy acids.

Phospholipids; and

Mixtures of any of the foregoing components.

The emollient/oil is generally used in an amount from about 1 to 20%, preferably 1 to 15% by weight of the composition. Generally, it should comprise no more than 50% by weight of the composition. It should be understood that where the emollient may also function as a structurant, it should not be doubly included such that, for example, if the structurant is 15% oleyl alcohol, no more than 5% oleyl alcohol as "emollient" would be added since the emollient (whether functioning as emollient or structurant) should preferably not comprise more than 20%, by weight of the composition of the component.

(b) Laundry Bars

For laundry bars, examples of suitable benefit agents include fabric care agents such as soil release agents, softening and/or conditioning agents, lubricants, sunscreens, flourescers, dyes, perfumes, dye fixatives, crease resist or preventative agents, water repellent agents and ironing aids amongst others.

Particular examples of suitable fabric care benefit agents include silicones, fabric softening clays, or L-beta phase surfactants.

It is especially preferred if the benefit agent gives a perceivable benefit to a fabric.

When the product is for use in laundering fabrics, the benefit agent can be defined as any agent which effects the feel, appearance, or the perception of a fabric. It is particularly preferred if the benefit agent is a fabric softening agent, a perfume, a polymeric lubricant, a photo protective agent (such as a sunscreen), a latex, a resin, a dye fixative agent, an encapsulated material, an antioxidant, an insecticide, a soil repelling agent, a soil release agent.

If the benefit agent is a fabric softening agent it preferably comprises a clay, a cationic active, or silicone. Suitable clays include a three layered smectite clay, preferably having a cation exchange capacity as described in GB-A-1 400 898. Especially preferred are clays which are 2:1 layer phyllosilicates possessing a lattice charge deficiency in the range of 0.2 to 0.4 g equivalents per half unit cell as described in EP-A-0 350 288.

Suitable cationic softening agents include quaternary ammonium softening compounds having a solubility in water at pH 2.5 and 20° C. of less than 10 g/l.

It is particularly advantageous if the cationic softening compound is a quaternary ammonium compound in which at least one long chain alkyl group is connected to the quaternary ammonium group via at least one ester link. Suitable cationic softeners are described in U.S. Pat. No. 4,137,180 and WO-A-93/23510.

If the benefit agent is a polymeric lubricant it may be any polymeric lubricant suitable for softening a fabric. Suitable lubricants include silicones in particular those disclosed in GB-A-1 549 180, EP-A-459 821 and EP-A-459 822.

The benefit agent may be a soil release polymer, suitable soil release polymers include polyesters of terephthalic acid and other aromatic dicarboxylic acids. Soil release polymers that may be used with the present invention which are the condensation products of aromatic dicarboxylic acids and dihydric alcohols include EP-A-185 427, EP-A-241 984, EP-A-241 985 and EP-A-272 033. Particularly preferred are the so called PET/POET (polyethylene terephthalate/polyoxyethylene terephthalate) and PET/PEG (Polyethylene terephthalate/polyethylene glycol) which are disclosed in U.S. Pat. No. 3,557,039, GB 1 467 098 and EP 1 305A (Procter & Gamble). Polymers of this type are available commercially, for example, as Permalose, Aquaperle and Milease (Trade Marks, ICI) and Repel-O-Tex SRP3 (Trade Mark, Rhône-Poulenc). Sulphonated non-end-capped polyester of terephthalic acid, isophthalic acid, sulphoisophthalic acid and ethylene glycol as described in PCT/FR95/00658, published 1 Dec. 1995 and sold commercially as Gerol (Trade mark Rhône-Poulenc) are also advantageous when used in conjunction with the present invention.

Latex materials can also be used as benefit agents. A latex is defined as a material suitable for improving the drape of fabric, suitable materials include a polyvinylacetate homopolymer such as 9802 (Vinamul).

Benefit agents may also include resins such as Knittex BE (Ciba-Geigy) or silicas such as Crosanaol NS (Crosfield), these benefit agents prevent pill formation on the fabric.

The benefit agent may be any material which is encapsulated. Suitable encapsulating materials include starches and poly(vinylacetate) and urea/formaldehyde condensate based materials.

Suitable materials that may be encapsulated include perfumes, insect repellents, fungicides, or photo protective agents.

(c) Shampoos and Conditioners

Compositions of this invention may contain any other ingredient normally used in hair treatment formulations. These other ingredients may include viscosity modifiers, preservatives, colouring agents, polyols such as glycerine and polypropylene glycol, chelating agents such as EDTA, antioxidants such as vitamin E acetate, fragrances, antimicrobials and sunscreens. Each of these ingredients will be present in an amount effective to accomplish its purpose. Generally these optional ingredients are included individually at a level of up to about 5% by weight of the total composition.

DESCRIPTION OF PREFERRED EMBODIMENTS

The present invention will now be explained in more detail by way of the following description of a preferred embodiment and with reference to the accompanying drawings in which.

Figure 1A:
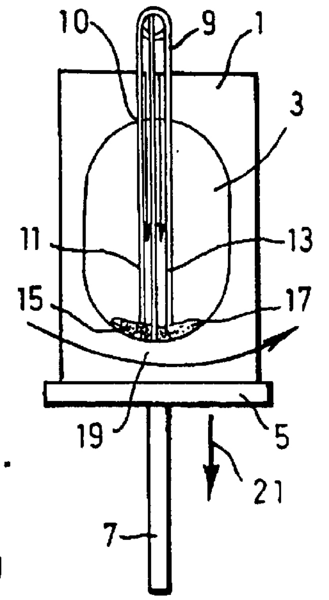
FIGS. 1A–1C show an apparatus according to the present invention for effecting a process according to the present invention for production of a detergent bar according to the present invention.
Figure 1B:
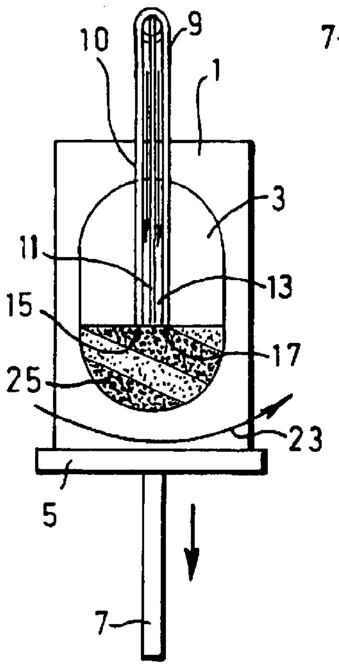
Figure 1C:
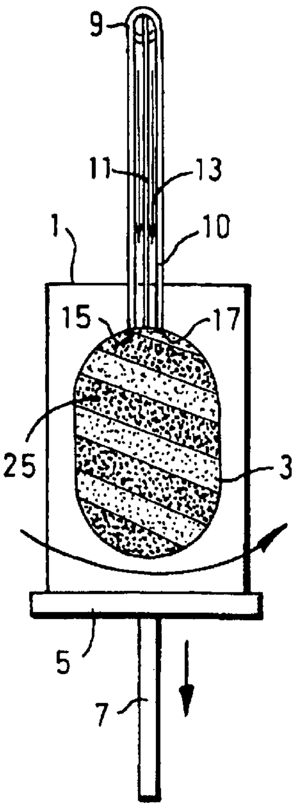

FIGS. 1A–1C show an apparatus according to the present invention. It provides a mould 1 in which is located a cavity 3. The mould is situated on a filling platform 5. The filling platform 5 is attached to a moveable actuator 7. An injection nozzle 9 is insertable into the cavity 3.

The mould 1 comprises a pair of aluminium mould parts defining a bar shape. These are as those conventionally used in die stamping of detergent bars, modified by the addition of a feed hole 10 sized to take the nozzle, and small holes (not shown) at appropriate places in the mould to allow air to vent during filling.

The nozzle 9 comprises a pair of internal conduits 11, 13. These conduits terminate, respectively, in orifices 15, 17.

As shown in FIG. 1A, at the start of the fill process, the injector head 9 is extended to maximum extent through an opening 10, into the mould 1, to extend into the cavity 3 so that the orifices 15, 17 are adjacent the bottom 19 of said mould. The mould is then lowered by lowering the filling platform in the direction of the arrow 21, under the action of actuator 7. Two separate streams of coloured and uncoloured (respectively) viscous detergent compositions are respectively injected through the nozzle 9, to separately exit via the orifices 15, 17.

The uncoloured component had the formulation as follows:

| | wt % active |
|---|---|
| Directly esterified fatty isethionate | 27.8 |
| Sodium stearate | 14.6 |
| Propylene glycol | 17.8 |
| Stearic acid | 12.8 |
| PEG 8000 | 9.7 |
| Coca amido propyl betaine | 4.9 |
| Paraffin wax | 2.9 |
| Sodium isethionate | 0.4 |
| Water | 5.6 |
| Minor additives (preservatives, perfume, etc) | 2.0 |
| TOTAL | 100.00 |

The coloured component had the same composition as the uncoloured formulation above but with 0.5 wt % green colorant on top of the amounts specified.

As the mould cavity fills, the actuator 7 is used to rotate the filling platform 5 and thus the mould 1 in the direction of arrow 23, to produce continuous spiral effect as shown in the thus-formed detergent bar 25, which is then allowed to solidify.

Figure 2:
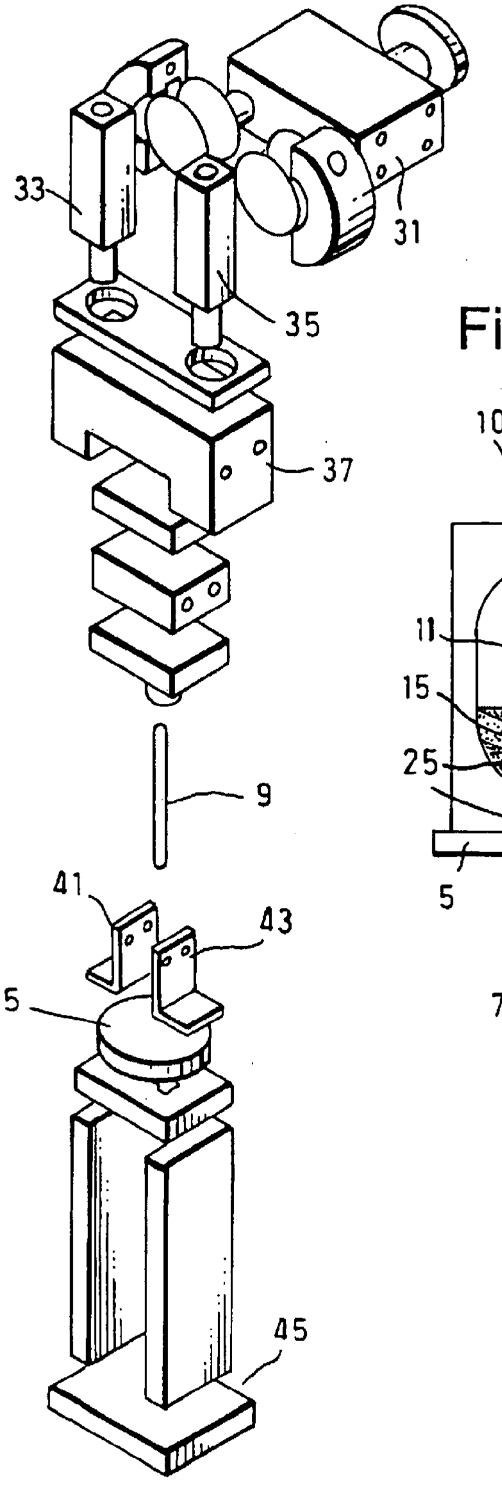
FIG. 2 shows an exploded view of details of the injector head nozzle and filling platform for use with an apparatus shown in FIG. 1.

Details of the injection head are shown in FIG. 2.

FIG. 2 shows details of the injection head and nozzle. It comprises a flow splitter 31 feeding a pair of injection units 33,35 which are supported in a block 37. The injection units pressurise the components to be injected and feed them to the nozzle 9. Also shown are the rotary filling platform 5 on which mould clamps 41, 43 are mountable. The rotary platform 5 is supported on a platform 45.

Turning now to FIGS. 3A to 3H, there are shown some non-limiting examples of bars which can be made according to the process described above with reference to FIGS. 1 and 2.

The simple stripe bar shown in FIG. 3 is comparable in pattern to that which can be made by a milling process. However a half turn operation will yield a two tone bar as shown in FIG. 3B, with an internal non-planar interface between coloured and uncoloured portions. More rotations during filling produce a spiral effect as described with reference to FIG. 1. Few rotations result in a broad spiral (FIG. 3C) or more rotations, a fine spiral (FIG. 3D).

Figure 3A:
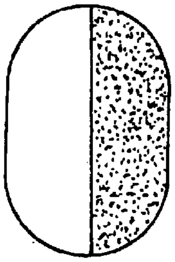
FIGS. 3A–3H show detergent bars according to the present invention, obtainable by use of the apparatus as shown in FIGS. 1 and 2.
Figure 3B:
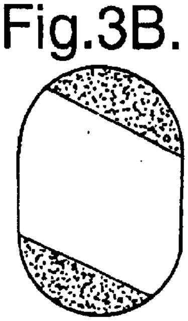
Figure 3C:
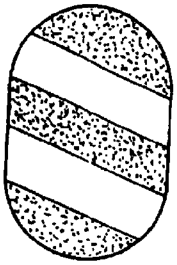
Figure 3D:
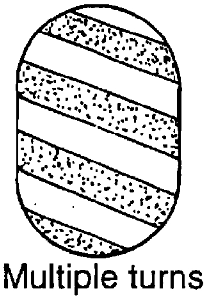
Figure 3E:
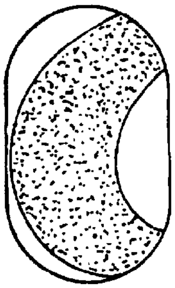
Figure 3F:
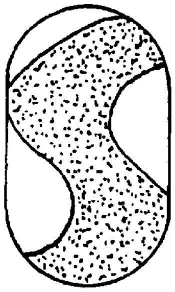
Figure 3G:
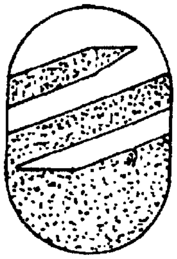
Figure 3H:
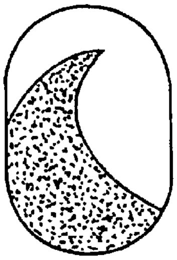

By reversing the direction of rotation during fill, more exotic patterns are also possible, e.g. wave effects (FIGS. 3E & 3F). By adjusting the relative flow rates of the two components during fill (including no flow at all) even more patterns are possible, e.g. feathered spirals (FIG. 3G), as well as wave crest shapes (FIG. 3H).

What is claimed is:

1. A process for manufacturing a detergent bar comprising a first distinct zone comprising a first component and at least a second distinct zone comprising a second component, said process comprising an injection step in which said first and second components are injected into a mould via nozzle means having a first orifice through which said first component is injected and at least a second orifice through which the second component is injected, and a solidification step in which the first and second components solidify in the mould to form the said detergent bar; wherein at least one component of the detergent bar comprises at least 5% by weight of that component of soap, synthetic detergent active or a mixture thereof; and wherein the nozzle means is inserted inside the mould and is withdrawn during injection moulding.

2. A process according to claim 1, in which said first and second components differ from one another in their colour.

3. A process according to claim 1, in which said first and second zones differ from one another in their chemical composition.

4. A process according to claim 1, wherein said first and second components differ in their rheological condition as they are injected into the mould cavities.

5. A process according to claim 1, wherein a single feedstock is split into separate streams and at least one such stream is post-dosed with an ingredient to cause it to differ from the other component, and/or is caused to differ in its rheological condition.

6. A process according to claim 3 in which one of said first and second zones comprises detergent and the other comprises a benefit agent.

7. A process according to claim 1, wherein at least one of the said first and second components has a viscosity of at least 1 Pa.s immediately upon exiting the respective orifice of the nozzle means and is delivered to the nozzle by application of pressure.

8. A process for manufacturing a detergent bar comprising a first distinct zone comprising a first component and at least a second distinct zone comprising a second component, said process comprising injection moulding in which said first and second components are injected into a mould via nozzle means having a first orifice through which said first component is injected and at least a second orifice through which the second component is injected, and a solidification step in which the first and second components solidify in the mould to form the said detergent bar; wherein at least one component of the detergent bar comprises at least 5% by weight of that component of soap, synthetic detergent active or a mixture thereof; and wherein relative rotary motion is effected between the nozzle means and mould during at least part of the injection moulding step; and wherein the rotary motion is continuous rotation and/or oscillatory.

9. A process according to claim 8, in which said first and second components differ from one another in their colour.

10. A process according to claim 8, in which said first and second zones differ from one another in their chemical composition.

11. A process according to claim 8, wherein said first and second components differ in their rheological condition as they are moulded into the mould cavities.

12. A process according to claim 8, wherein a single feedstock is split into separate streams and at least one such stream is post-dosed with an ingredient to cause it to differ from the other component, and/or is caused to differ in its rheological condition.

13. A process according to claim 10, in which one of said first and second zones comprises detergent and the other comprises a benefit agent.

14. A process according to claim 8, wherein at least one of the said first and second components has a viscosity of at least 1 Pa.s immediately upon exiting the respective orifice of the nozzle means and is delivered to the nozzle by application of pressure.

15. A process for manufacturing a detergent bar comprising a first distinct zone comprising a first component and at least a second distinct zone comprising a second component, said process comprising an injection step in which said first and second components are injected into a mould via nozzle means having a first orifice through which said first component is injected and at least a second orifice through which the second component is injected, and a solidification step in which the first and second components solidify in the mould to form the said detergent bar; wherein at least one component of the detergent bar comprises at least 5% by weight of that component of soap, synthetic detergent active or a mixture thereof; and wherein the injection rate of the first and/or second component is varied during the injection step.

16. A process according to claim 15, in which said first and second components differ from one another in their colour.

17. A process according to claim 15, in which said first and second zones differ from one another in their chemical composition.

18. A process according to claim 15, wherein said first and second components differ in their rheological condition as they are injected into the mould cavities.

* * * * *